US012592519B2

(12) United States Patent
Hsieh

(10) Patent No.: US 12,592,519 B2
(45) Date of Patent: Mar. 31, 2026

(54) SIGNAL CONNECTOR HAVING PROTRUSION OF INSULATING BASE

(71) Applicant: BIZLINK INTERNATIONAL CORP., New Taipei City (TW)

(72) Inventor: Chin-An Hsieh, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 300 days.

(21) Appl. No.: 18/346,797

(22) Filed: Jul. 4, 2023

(65) Prior Publication Data

US 2024/0014603 A1 Jan. 11, 2024

(30) Foreign Application Priority Data

Jul. 11, 2022 (TW) ................................ 111125981

(51) Int. Cl.
*H01R 13/6471* (2011.01)
*H01R 12/72* (2011.01)
*H01R 12/73* (2011.01)

(52) U.S. Cl.
CPC ....... *H01R 13/6471* (2013.01); *H01R 12/721* (2013.01); *H01R 12/737* (2013.01)

(58) Field of Classification Search
CPC ............ H01R 13/6471; H01R 13/6477; H01R 12/737
See application file for complete search history.

(56) References Cited

U.S. PATENT DOCUMENTS

| | | | | |
|---|---|---|---|---|
| 5,618,191 | A | 4/1997 | Chikano et al. | |
| 8,579,662 | B2 * | 11/2013 | Briant | H01R 12/716 439/607.08 |
| 8,870,600 | B2 * | 10/2014 | Wu | H01R 13/6467 439/637 |
| 9,083,130 | B2 * | 7/2015 | Casher | H01R 12/00 |
| 10,490,920 | B2 * | 11/2019 | Manickam | H01R 13/648 |
| 10,574,000 | B1 * | 2/2020 | McClinton | H01R 13/6471 |
| 10,756,489 | B2 * | 8/2020 | Hu | H01R 13/6594 |
| 10,965,062 | B1 * | 3/2021 | Miller | H01R 13/6473 |
| 11,450,979 | B2 * | 9/2022 | Phillips | H01R 12/721 |
| 11,742,621 | B2 * | 8/2023 | Lin | H01R 13/6594 439/607.11 |
| 11,870,171 | B2 * | 1/2024 | Guo | H01R 13/6471 |

(Continued)

FOREIGN PATENT DOCUMENTS

| | | | | |
|---|---|---|---|---|
| CN | 202259870 U | | 5/2012 | |
| CN | 114639979 A | * | 6/2022 | H01R 13/652 |

(Continued)

*Primary Examiner* — Marcus E Harcum
(74) *Attorney, Agent, or Firm* — CKC & Partners Co., LLC

(57) ABSTRACT

The present invention provides a signal connector, comprising a terminal module, sequentially including a first ground terminal, a first signal terminal, a second signal terminal and a second ground terminal arranged in parallel; and an insulating base, Including a plug opening, the terminal module is fixed at the connection opening, the insulating base includes an inner surface, and a protrusion is arranged on the inner surface between the first signal terminal and the second signal terminal, the protrusion is used to block at least a part of the first signal terminal and the second signal terminal, and the inner surface between the first signal terminal and the first ground terminal is flat.

7 Claims, 12 Drawing Sheets

(56) References Cited

U.S. PATENT DOCUMENTS

| | | | | |
|---|---|---|---|---|
| 12,126,120 | B2 * | 10/2024 | Zeng | H01R 13/6582 |
| 2019/0190212 | A1 * | 6/2019 | Fang | H01R 13/646 |
| 2020/0350717 | A1 * | 11/2020 | Dong | H01R 13/112 |
| 2020/0395698 | A1 * | 12/2020 | Hou | H01R 13/405 |
| 2022/0069496 | A1 * | 3/2022 | Yi | H01R 12/716 |
| 2022/0344872 | A1 * | 10/2022 | Wu | H01R 13/6585 |
| 2023/0411908 | A1 * | 12/2023 | Wu | H01R 12/721 |

FOREIGN PATENT DOCUMENTS

| | | | |
|---|---|---|---|
| TW | 201424134 | A | 6/2014 |
| TW | I491120 | B | 7/2015 |

* cited by examiner

SIGNAL CONNECTOR HAVING PROTRUSION OF INSULATING BASE

CROSS-REFERENCE TO RELATED APPLICATIONS

This application claims priority to Taiwan Application Serial Number 111125981, filed Jul. 11, 2022, which is herein incorporated by reference.

BACKGROUND

Field of Invention

The present disclosure relates to a connector, especially relates to a high-frequency connector with better crosstalk performance.

Description of Related Art

See FIG. 1A to FIG. 1C. FIG. 1A is a schematic view of an application environment of a conventional SFF-TA-1002 high-frequency connector; FIG. 1B is a schematic view of the connector of FIG. 1A after two side structures are omitted; FIG. 1C is a schematic view of the relative relationship between a terminal module and an insulating base in FIG. 1B. As shown in FIGS. 1A to 1C, the connector includes an insulating base 2 and two sets of terminal modules 1 disposed in the insulating base 2 and facing each other. Each of the terminal modules 1 includes a plurality of terminal groups 10. Each of the terminal groups 10 includes a first ground terminal 11, a first signal terminal 12, a second signal terminal 13, and a second ground terminal 14 from left to right. Usually, the second ground terminal 14 of one terminal group 10 can be shared and used as the first ground terminal 11 of another adjacent terminal group 10.

In addition, see FIG. 1D, which is a schematic diagram of a crosstalk performance of the connector shown in FIG. 1A to FIG. 1C, and is simulated by the "FEXT" method (the same below). The four lines in FIG. 1D respectively correspond to the crosstalk performance of one terminal group 10 in the terminal module 1. As shown in FIG. 1D, at a frequency of about 20 GHz, each terminal group 10 has obvious crosstalk phenomenon, and the crosstalk intensity is about −27 dB. In the field of high-speed transmission, there is a great room for improving such a performance.

SUMMARY

In view of this, one object of the present disclosure is to provide a connector that can improve the crosstalk performance of a high-frequency connector.

The applicant found that the crosstalk peak in the aforementioned prior art is caused by ground loop resonance. For this reason, the applicant proposes to dispose a protrusion having a certain height between two signal terminals of a differential pair at movable sections, and to keep the differential pair open to adjacent ground terminals without disposing an obvious protrusion, which can significantly improve the ground loop resonance effect of the connector and reduce crosstalk.

It should be noted that the height of the protrusion relative to the signal terminal is critical to the effect of improving the crosstalk. Generally speaking, when the entire protrusion does not protrude from the first signal terminal, the effect of improving crosstalk is better. In addition, if the protrusion protrudes from the first signal terminal and the height of its protruding part is greater than that of the first signal terminal, the effect of improving the crosstalk signal will be weakened with the protruding height of the protrusion. Furthermore, after the protruding height reaches 30% of the thickness of the signal terminal, the improved effect will be almost non-existent. If the protruding height exceeds 30% of the thickness of the signal terminal, it will have an adverse effect and the adverse effect will gradually increase with the increase of the protruding height. Therefore, the total height of the protrusion is recommended to be equal to or less than three times the thickness of the first signal terminal, so as to ensure that the protruding height of the protruding signal terminal does not exceed the aforementioned 30% threshold when the signal terminal transmits a signal.

Moreover, the phenomenon of crosstalk can be further improved by ensuring that the minimum parallel distance between the movable sections of the first signal terminal and the movable sections of the second signal terminal along a width direction is smaller than the minimum parallel distance between the first signal terminal and the first ground terminal. If the ratio of the larger to the smaller of the aforementioned two minimum parallel distances is greater than or equal to 1.1, the effect will be better. Furthermore, if it is further ensured that the minimum parallel distance between the first signal terminal and the second signal terminal at the fixed sections is smaller than the minimum parallel distance between the first signal terminal and the first ground terminal, and the ratio of the larger to the smaller of the aforementioned two minimum parallel distances is greater than or equal to 1.1, the improved effect of crosstalk will be better.

To sum up, in the aforementioned embodiments of the present disclosure, by disposing protrusion in the two signal terminals, retaining a flat surface/empty space between the signal terminal and the ground terminal, and controlling the relative distance between the terminals can effectively improve the crosstalk phenomenon caused by ground loop resonance in high-frequency connectors, thereby effectively improving transmission quality.

BRIEF DESCRIPTION OF THE DRAWINGS

Aspects of the present disclosure are best understood from the following detailed description when read with the accompanying figures. It is noted that, in accordance with the standard practice in the industry, unless otherwise stated, the proportions of the components in the drawings are drawn accurately according to the actual product.

DETAILED DESCRIPTION

Figure 1A:
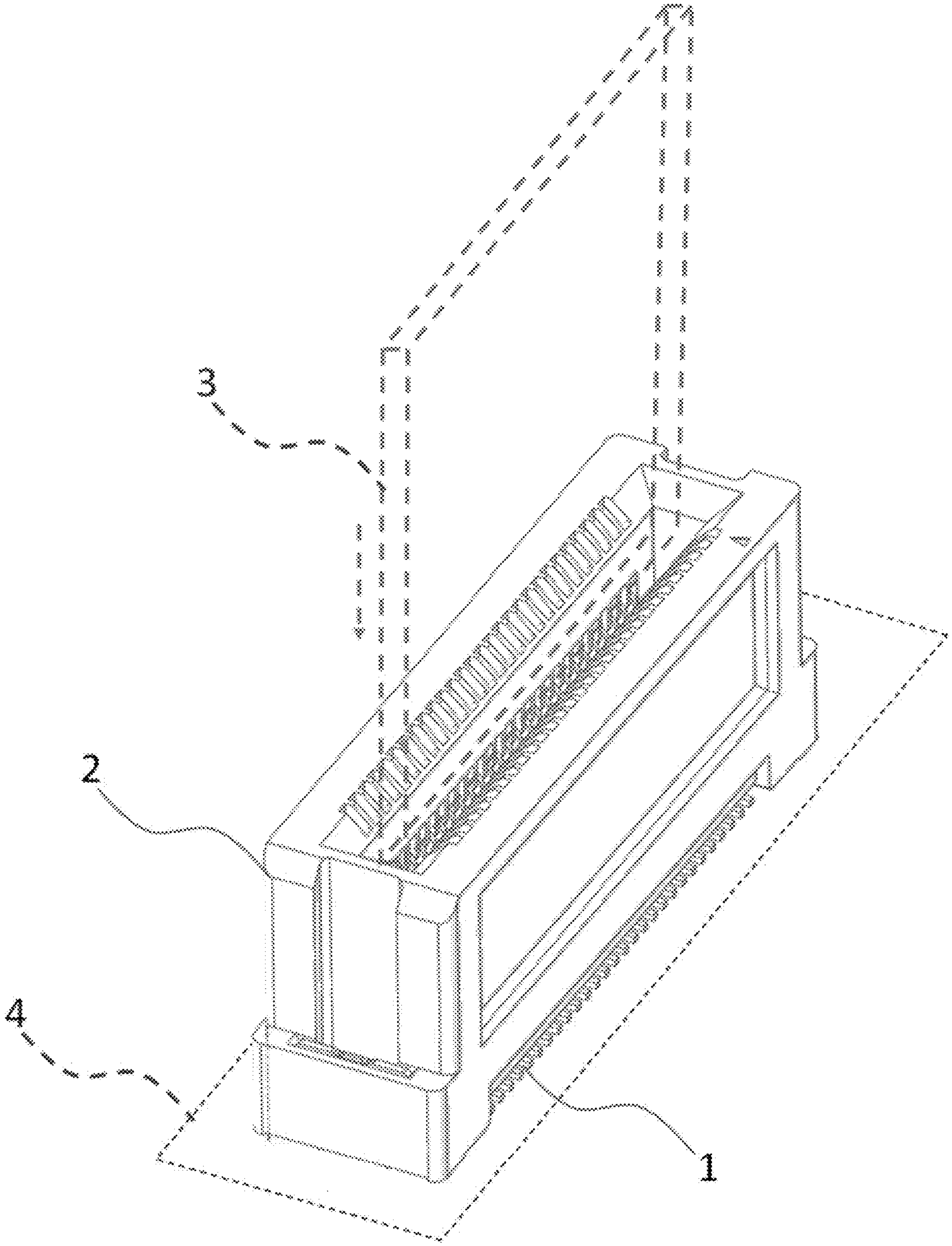
Fig. 1A (Prior Art)
FIG. 1A is a schematic view of an application environment of a conventional high-frequency connector.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "below," "left," "right," "inner," "outer" and the like, may be used herein for ease of description to describe one element or feature's relationship to another element(s) or feature(s) as illustrated in the figures.

A first embodiment of the present disclosure will be described below. In this example, a board connector for fixing on a substrate 4 and conforming to the SFF-TA-1002 specification is disclosed. Its appearance is similar to that of FIG. 1A, but its internal structure is different.

Figure 2A:
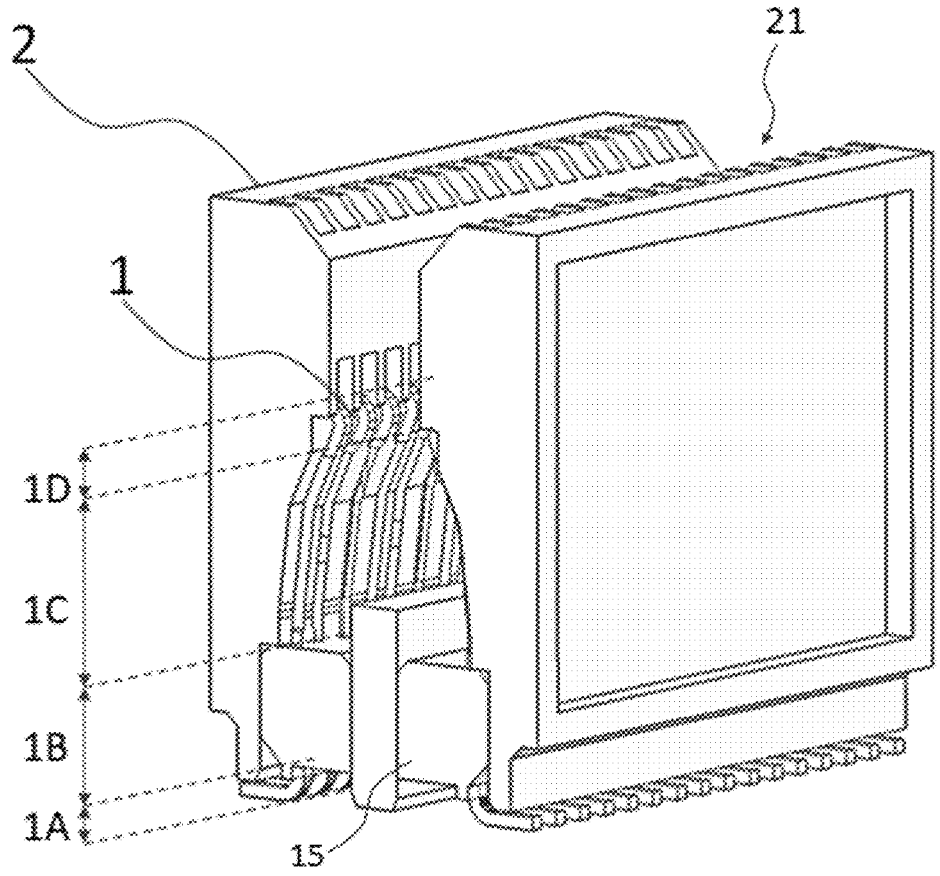
FIG. 2A is a schematic view of a connector according to the first embodiment of the present disclosure after two side structures are omitted.

Referring to FIG. 1A and FIG. 2A, FIG. 2A is a schematic view of a connector according to the first embodiment of the present disclosure after two side structures are omitted; an insulating base 2 of FIG. 2A includes opposite left part and right part, and includes a vertical wall structure in the middle of the left part and the right part. The left part, the right part, and the vertical wall structure are connected by an omitted side, and are integrally formed as a single piece by injection molding. The upper part of the insulating base 2 has a plug opening 21 to be inserted by the PCB of an external connector 3, and thus two terminal modules 1 in the insulating base 2 are electrically connected to the external connector 3.

Figure 1B:
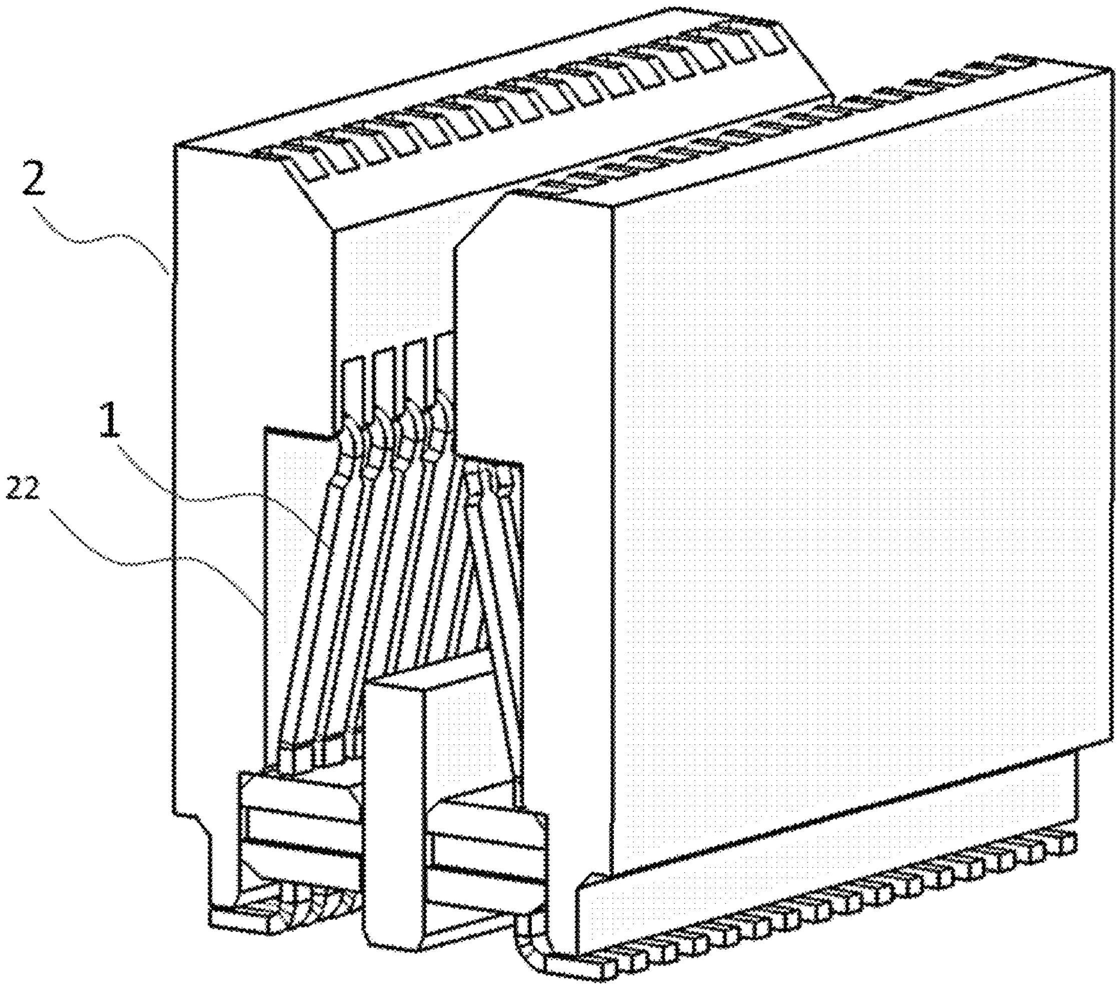
Fig. 1B (Prior Art)
FIG. 1B is a schematic view of the connector of FIG. 1A after two side structures are omitted.
Figure 1C:
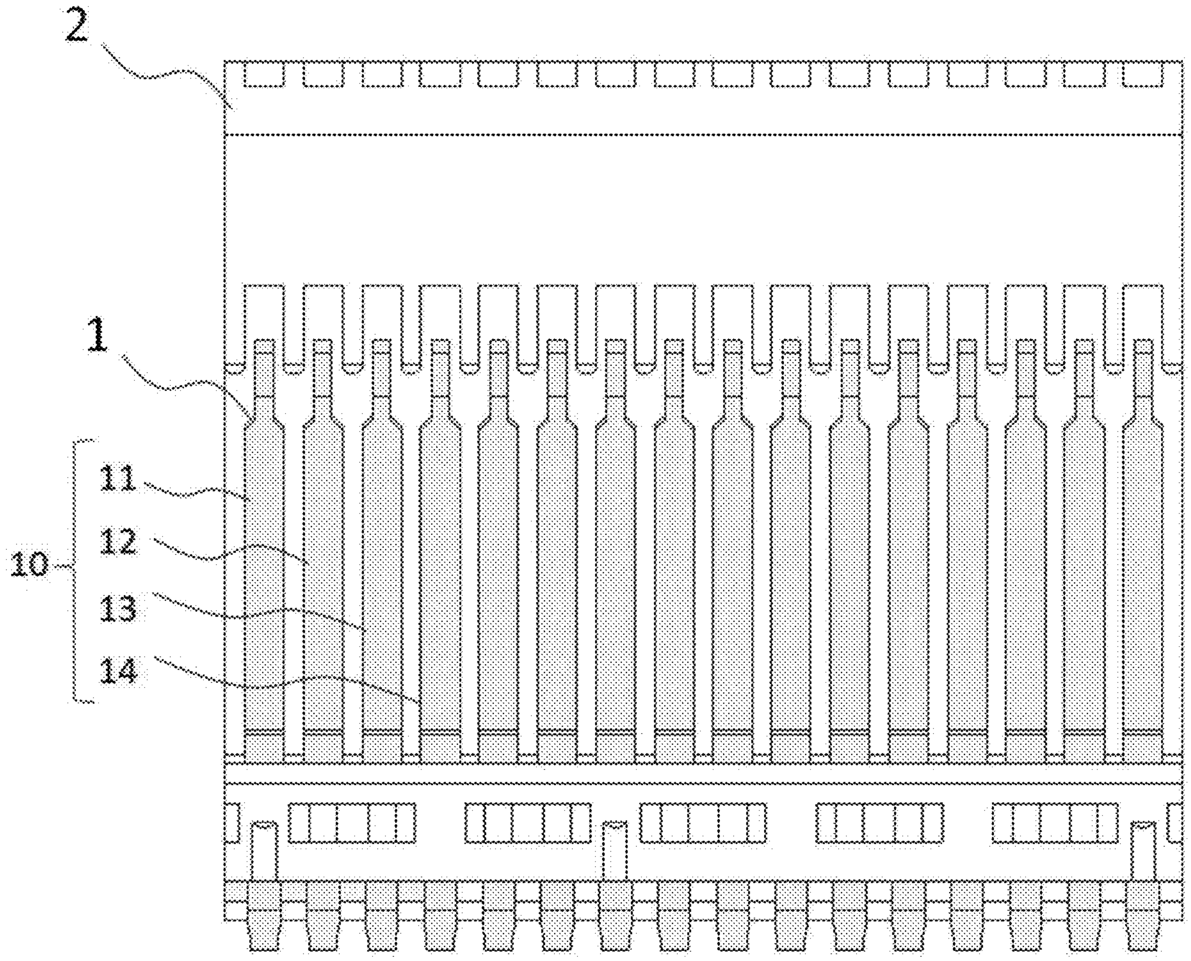
Fig. 1C (Prior Art)
FIG. 1C is a schematic view of a relative relationship between a terminal module and an insulating base in FIG. 1B.

In the following description, the difference between the connector of this embodiment and the prior art will be explained. See FIG. 1B, the inner surface 22 of a traditional connector is a vertical flat surface. On the contrary, in the first embodiment of the present disclosure, the inner surface 22 of the insulating base 2 is designed with an inclined surface. Specifically, see FIG. 2A and FIG. 2B, the insulating base 2 includes the two inner surfaces 22 opposite to each other. From bottom to top, each of the inner surfaces 22 facing the terminal module 1 has a stepped section 22C, a flat part 22A, and an inclined part 22B adjacent to the flat part 22A in sequence. The thickness of the inclined part 22B is gradually increased along a vertical direction. Such an inclined design can enable the insulating base 2 to attach the signal terminals of the terminal module 1 to decrease the distance between the inner surface 22 and the terminal module 1, which helps to control crosstalk.

Figure 2B:
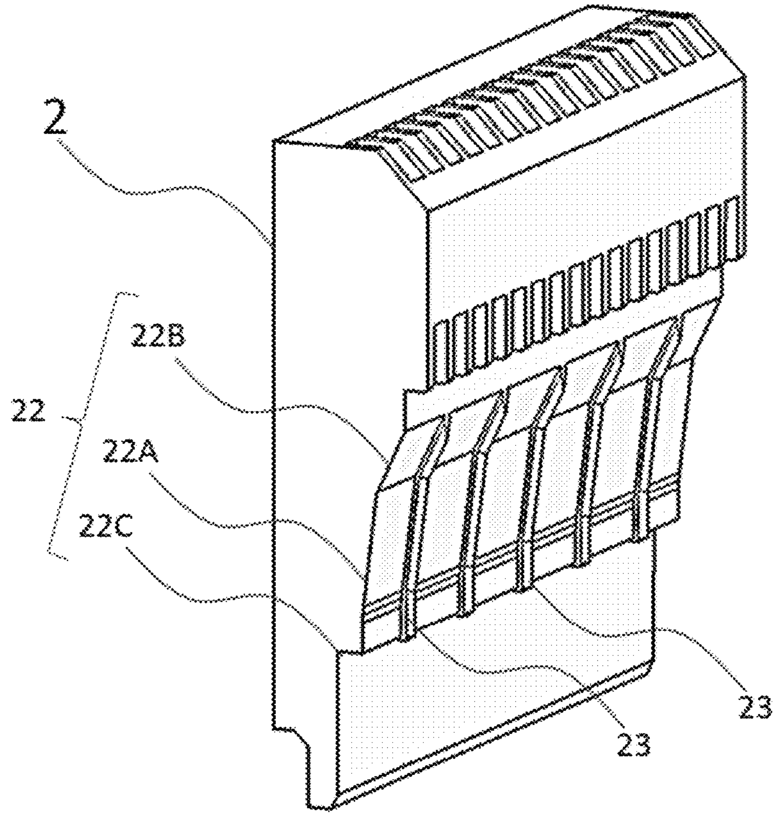
FIG. 2B is a schematic view of an inner surface of an insulating base of the first embodiment.

Moreover, the inner surface 22 has plural protrusions 23 in a ribbed arrangement and disposed at regular intervals along a widthwise direction. Each of the protrusions 23 is used to form a block between the first signal terminal 12 and the second signal terminal 13. Each of the protrusions 23 is formed by extending from the inner surface 22 thereon along a horizontal direction and tapering. In this embodiment, each of the protrusions 23 is located on the inner surface 22, and the length of the protrusion 23 along the widthwise direction is about 0.15 mm, while the highest height of the protrusion 23 is about 0.15 to 0.16 mm, and a gap along the widthwise direction and between the corresponding first and second signal terminals 12 and 13 is about 0.2 mm. See FIG. 2B, FIG. 2B is a schematic view of the inner surface of the insulating base of the first embodiment. As shown in FIG. 2B, each of the protrusions 23 may be triangular prism shape, thereby ensuring easy demolding during manufacturing, ensuring crosstalk improvement, and providing more space for terminal movement to avoid permanent deformation caused by accidental compression during the terminal movement. However, the shape of the protrusion 23 is not limited to triangular prism shape, and the protrusion 23 may be rectangular and other shapes as deemed necessary.

In addition, in this embodiment, the protrusion 23 continuously extends from the stepped section 22C, through the flat part 22A, and to an end of the inclined part 22B. But when applied, the protrusion 23 may be divided or replaced with plural finer structures, and the present disclosure is not limited in this regard. Furthermore, in this embodiment, except an end surface of the protrusion 23 forming a section substantially along the vertical direction, the height of the other parts of the protrusion 23 remains substantially the same. The so-called "the same" means that when the maximum value is divided by the minimum value, its value is between 1 and 1.1. However, when necessary, the height of the protrusion 23 at different positions can be gradually increased or decreased with the change of the position in the vertical direction to meet the requirement of manufacturability. Moreover, an end surface of the protrusion 23 and the stepped section 22C are substantially coplanar in the horizontal direction. In other words, the extending directions of the two end surfaces of the protrusion 23 are perpendicular to each other. It is to be noted that the flat part 22A and the inclined part 22B have a certain degree of inclination relative to the vertical direction, but the slope of the flat part 22A is smaller. Likewise, such a design enables the inner surface 22 to conform to the shape of a terminal as much as possible so that it can be as close as possible to the terminal.

Figure 2C:
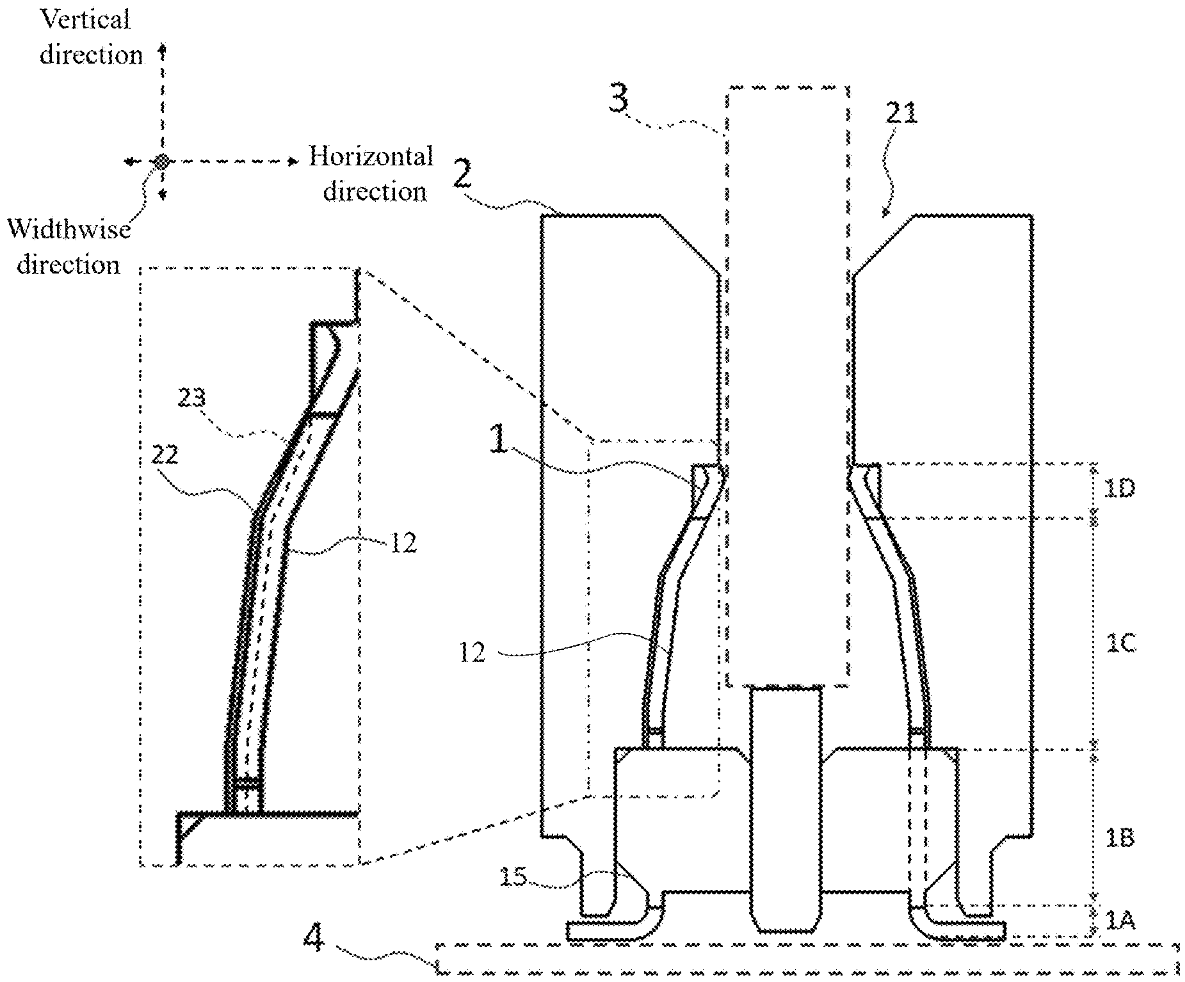
FIG. 2C is a schematic view of a relative position between a terminal module and the insulating base of the connector of the first embodiment.
Figure 2D:
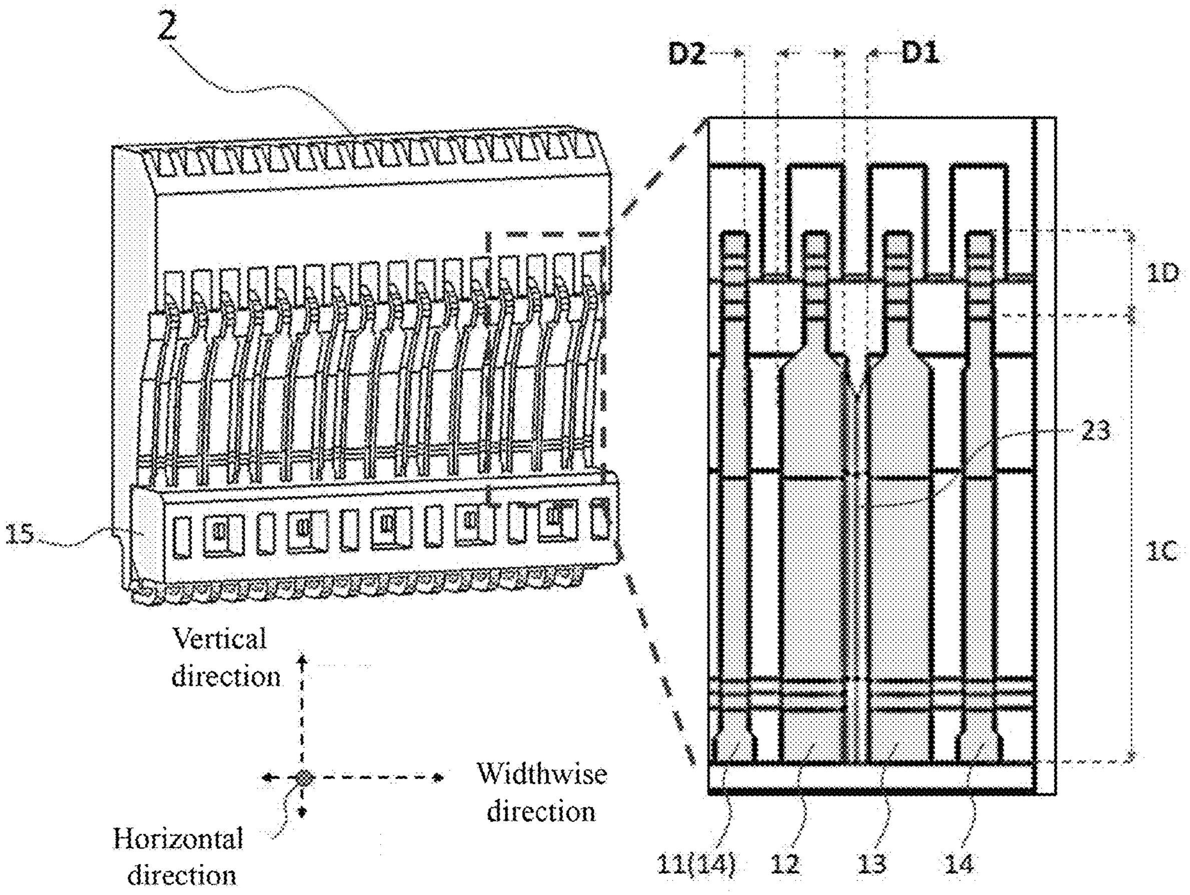
FIG. 2D is a schematic view of a group of conductive terminals of the first embodiment.

As shown in FIG. 2A, the two terminal modules 1 in the insulating base 2 are respectively fixed at the left and right sides of the plug opening 21. In this embodiment, each of the two terminal modules 1 includes sixteen conductive terminals and a connection base 15 that is directly formed on the surfaces of the conductive terminals by injection molding, and is fixed by the connection base 15 and the insulating base 2. In this embodiment, the thickness of each of the terminals in the two terminal modules 1 is about 0.2 mm. Every four conductive terminals form one conductive terminal group 10. See FIG. 2D, FIG. 2D is a schematic view of the conductive terminal groups 10 of the first embodiment. Each of the conductive terminal groups 10 sequentially includes the first ground terminal 11, the first signal terminal 12, the second signal terminal 13, and the second ground terminal 14 in sequence. The ground terminal may be shared with another adjacent conductive terminal group 10. The first signal terminal 12 and the second signal terminal 13 form a differential pair. By function, each of the terminals may substantially include a soldering section 1A, a fixing section 1B, a movable section 1C, and a contact section 1D in sequence. The soldering section 1A is soldered on the substrate 4. The fixing section 1B is the part buried in the connection base 15. The contact section 1D is used to electrically connect the PCB of the external connector 3, and the movable section 1C connects the fixing section 1B and the contact section 1D.

In order to improve crosstalk, the protrusion 23 is configured to form a block between the first signal terminal 12 and the second signal terminal 13. The position and the size of the protrusion 23 need to meet specific requirements. First, as shown in FIG. 2C, FIG. 2C is a schematic view of a relative position between the terminal module and the insulating base of the connector of the first embodiment. It is to be noted that the state of the terminal module 1 in FIG. 2C is shown after the PCB of the external connector 3 is inserted into the plug opening 21 and coupled to the terminal module 1. The protrusion 23 needs to be located between the movable section 1C of the first signal terminal 12 and the movable section 1C of the second signal terminal 13 for shielding/blocking at least a part of each of the first and second signal terminals 12 and 13. The meaning of the previous sentence is that part of the area is shielded/blocked by the protrusion 23 and cannot be observed when viewed from the first signal terminal 12 in the widthwise direction. Furthermore, the inner surface 22 between the first signal terminal 12 and the first ground terminal 11 has no protrusion, and is flat and empty, as shown in FIG. 2D. If a space between A and B components is said to be flat, it can be understood that no structure between the A and B components blocks the A and B components.

See FIG. 2C, in this embodiment, when the connector transmits signals and the terminal has been pressed by the external connector 3, the protrusion 23 is buried between the first signal terminal 12 and the second signal terminal 13. That is, the entire protrusion 23 does not protrude outward from the first signal terminal 12.

Specifically, please see FIG. 2C, in this embodiment, when the connector is completely inserted and transmits data, and the height of the protrusion 23 is enough to shield the lower 50% area of the first signal terminal 12 (i.e., the height of the protrusion 23 is just at half of the thickness direction of the first signal terminal 12), the improved effect of crosstalk is the best. However, if the height of the protrusion 23 is increased to shield more area of the first signal terminal 12, the improved effect of crosstalk is reduced. If the height of the protrusion 23 protrudes outward from the first signal terminal 12, and the protruding height from the first signal terminal 12 reaches 30% of the thickness of the signal terminal, an adverse effect will occur. At this time, the effect is almost the same as that without disposing the protrusion. On the other hand, if the height of the protrusion 23 is decreased to shield the decreased area of the first signal terminal 12 from 50%, the improved effect of crosstalk is also gradually reduced. Until the shielded area is zero, the improved effect of crosstalk does not exist. At the same time, the first signal terminal 12 is preferably suspended from the inner surface 22 and not in contact with the inner surface 22. In other words, when the overlapping ratio of the protrusion 23 and the first signal terminal 12 along the horizontal direction is 50%, the improved effect of crosstalk is the best. If the overlapping ratio is more than or less than 50%, the improved effect of crosstalk is gradually reduced. When the overlapping ratio is substantially between 30% and 70% of the side area of the first signal terminal 12, the improved effect of crosstalk is better. In brief, the protrusion 23 is buried between the first signal terminal 12 and the second signal terminal 13, the improved effect of crosstalk is better.

In order to achieve the aforementioned effect, the height of the protrusion 23 is proposed being lower than the thickness of the first signal terminal 12 in accordance with the design of the insulating base 2. The calculation of the height of the protrusion 23 is referred to the maximum value along the horizontal direction from the inner surface 22 at any position of the entire protrusion 23. In this embodiment, the height of the protrusion 23 is less than 1.5 times the thickness of the first signal terminal 12. More precisely, in this embodiment, the height of the protrusion 23 is merely less than 0.85 times the thickness of the first signal terminal 12. Since the size of the protrusion 23 is small, the protrusion 23 has the advantage of being easily manufactured.

In addition, the minimum parallel distance between the movable sections 1C of the first signal terminal 12 and the movable sections 1C of the second signal terminal 13 and along the widthwise direction is a first distance D1, the minimum parallel distance between the first signal terminal 12 and the first ground terminal 11 is a second distance D2, and the first distance is less than the second distance (i.e., D2>D1). When the ratio of the second distance to the first distance is greater than or equal to 1.1 (i.e., D2/D1≥1.1), the improved effect is more obvious. In addition, the minimum parallel distance between the first signal terminal 12 and the second signal terminal 13 at the fixing sections 1B is a third distance, the minimum parallel distance between the first signal terminal 12 and the first ground terminal 11 is a fourth distance. When the third distance is less than the fourth distance, and a value of the fourth distance divided by the third distance is greater than or equal to 1.1 (not shown), the improved effect is better.

Figure 1D:
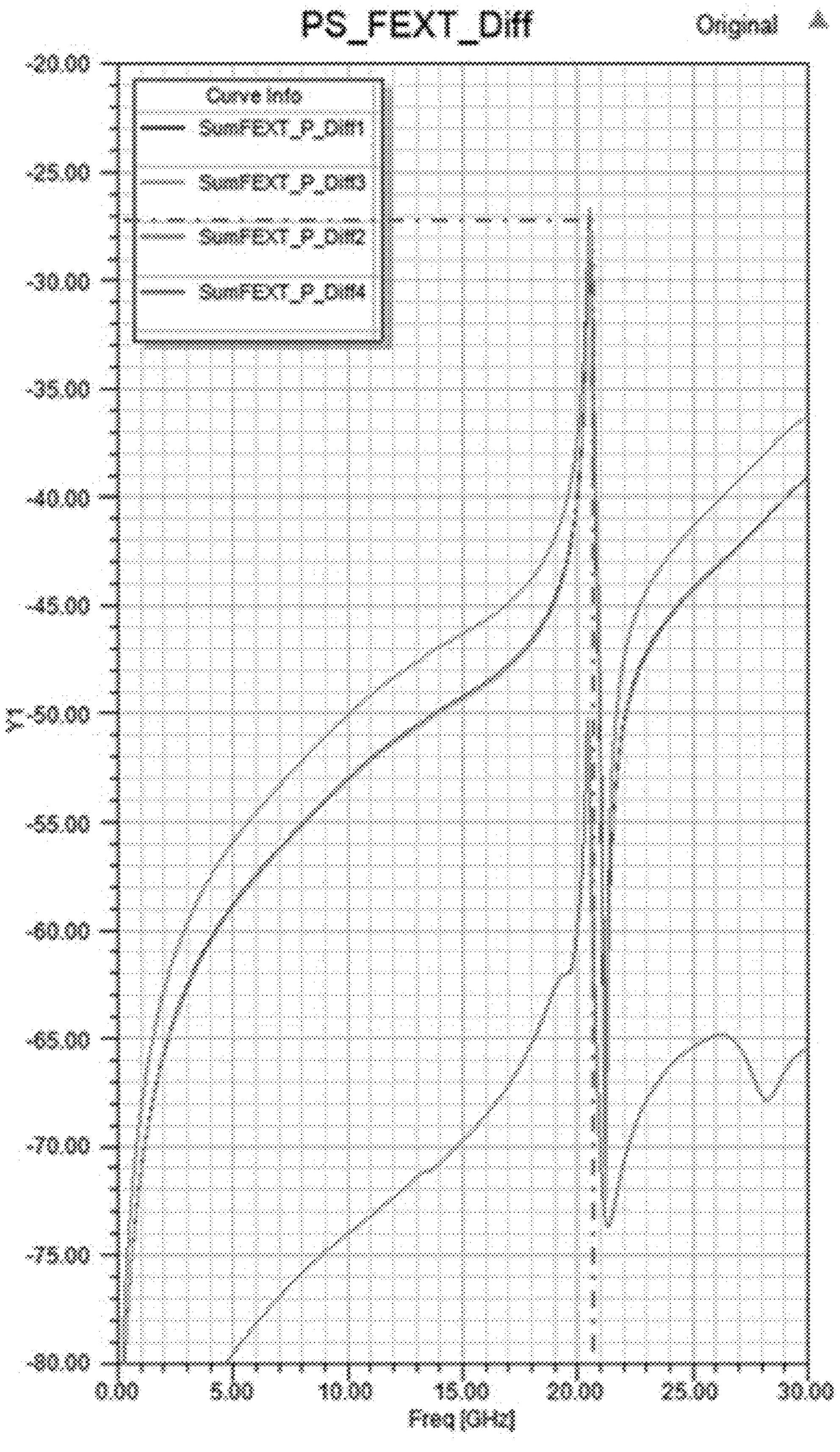
Fig. 1D (Prior Art)
FIG. 1D is a simulation diagram of the crosstalk of the connector of FIG. 1A.
Figure 2E:
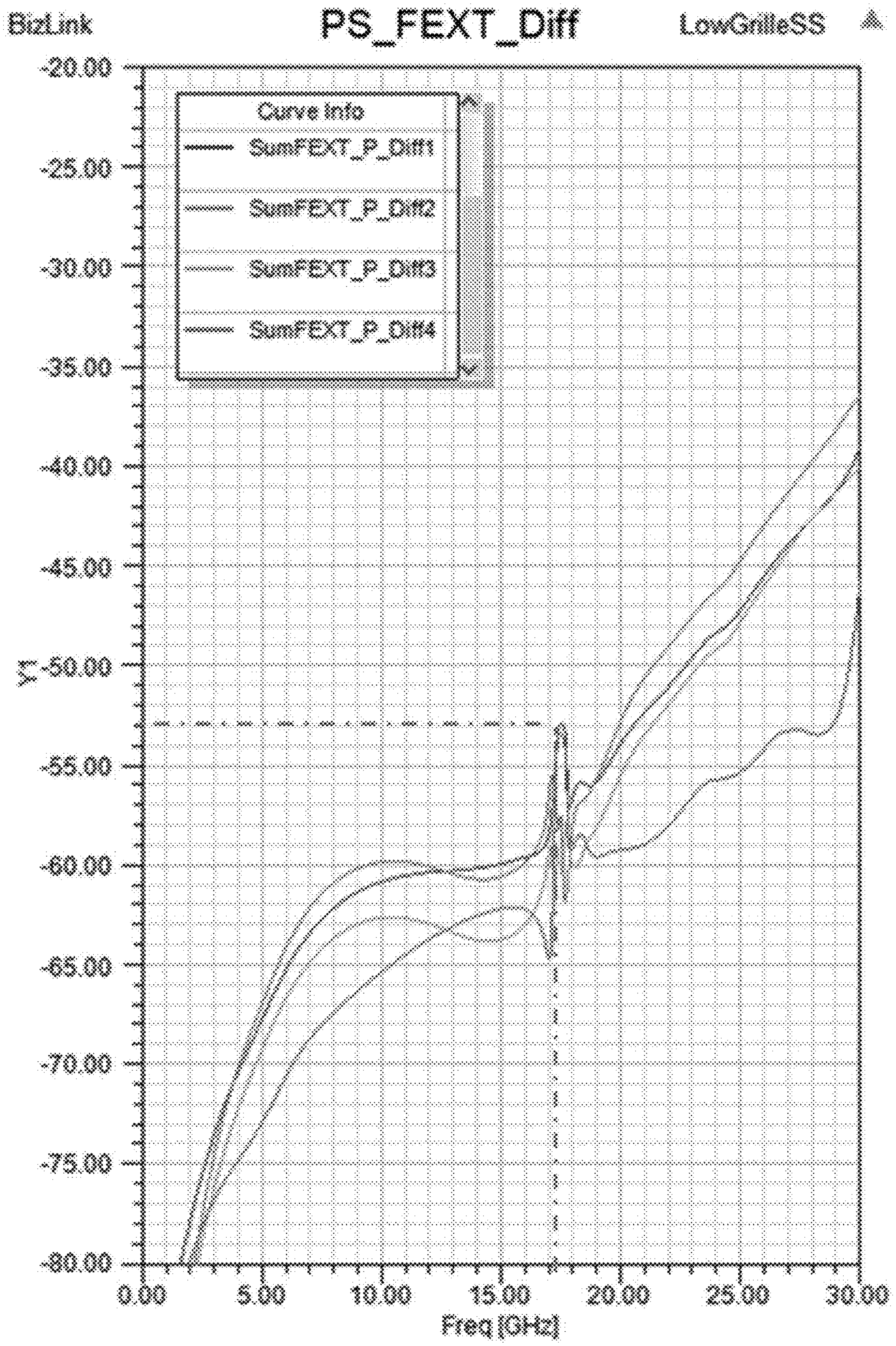
FIG. 2E is a simulation diagram of the crosstalk of the connector of the first embodiment.

See FIG. 2E, FIG. 2E is a simulation diagram of the crosstalk of the connector of the first embodiment. As shown in FIG. 2E, based on the design of the first embodiment and the other structures the same as the design of FIG. 1B, the peak of crosstalk is reduced from −27 dB of FIG. 1D to −53 dB. The peak of energy is reduced to about 2.5 thousandths of the original value, thereby effectively reducing the impact of crosstalk.

Figure 3A:
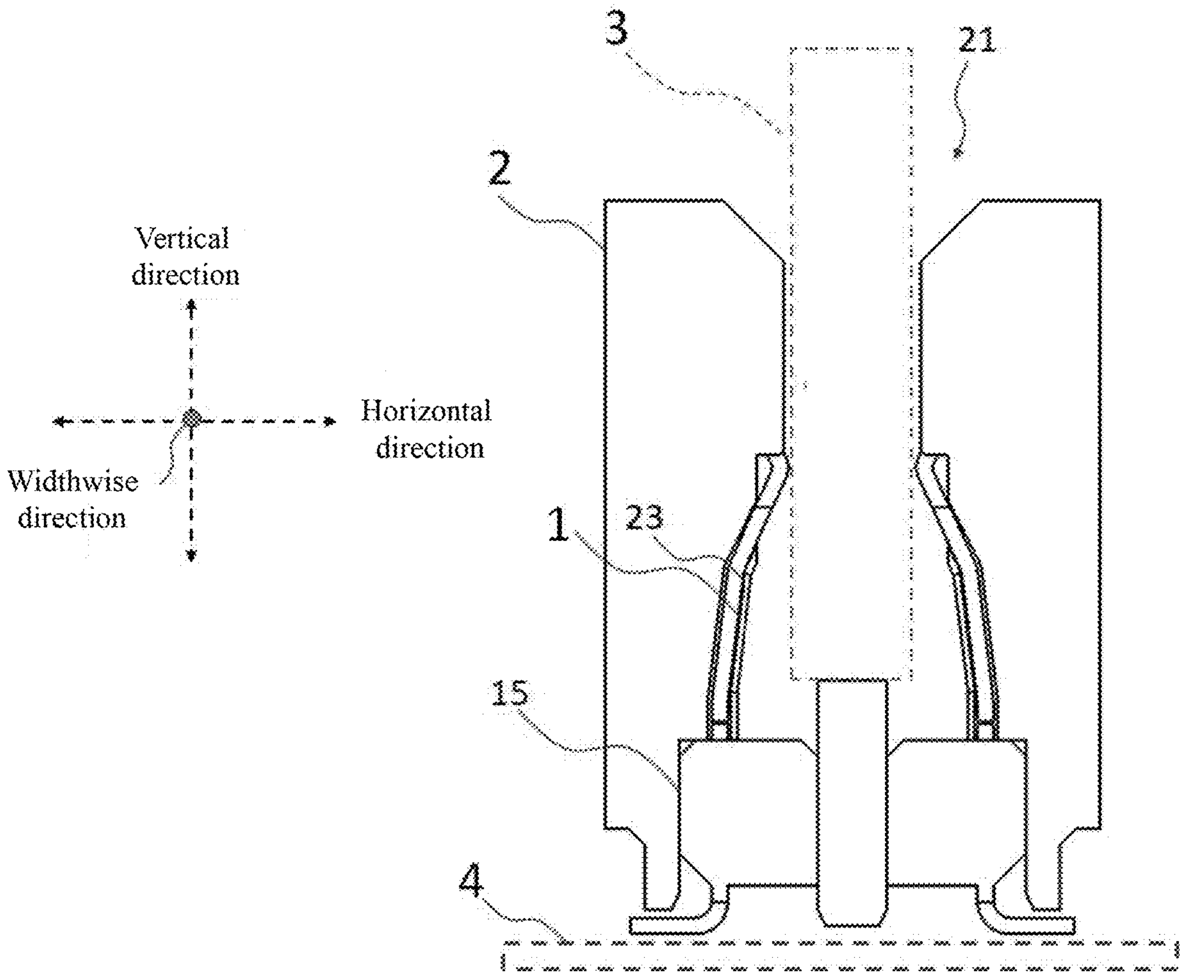
FIG. 3A is a schematic view of a relative position between the terminal module and the insulating base of the connector of the second embodiment.

Moreover, please see FIG. 3A, which provides the second embodiment of the present disclosure. The difference between the second embodiment and the first embodiment is that the height of the protrusion 23 is slightly higher than the first signal terminal 12 and the second signal terminal 13 when the external connector 3 is inserted into the plug opening 21 and starts to transmit signals. Specifically, at least one part of the protrusion 23 protrudes outward from the first signal terminal 12, and the height of the protruding part is greater than 30% of the thickness of the first signal terminal 12. See FIG. 3B, as shown in FIG. 3B, based on the design of the second embodiment and the other structures the same as the design of FIG. 1B, the peak of crosstalk is reduced from −27 dB of FIG. 1D to −35 dB.

Figure 4:
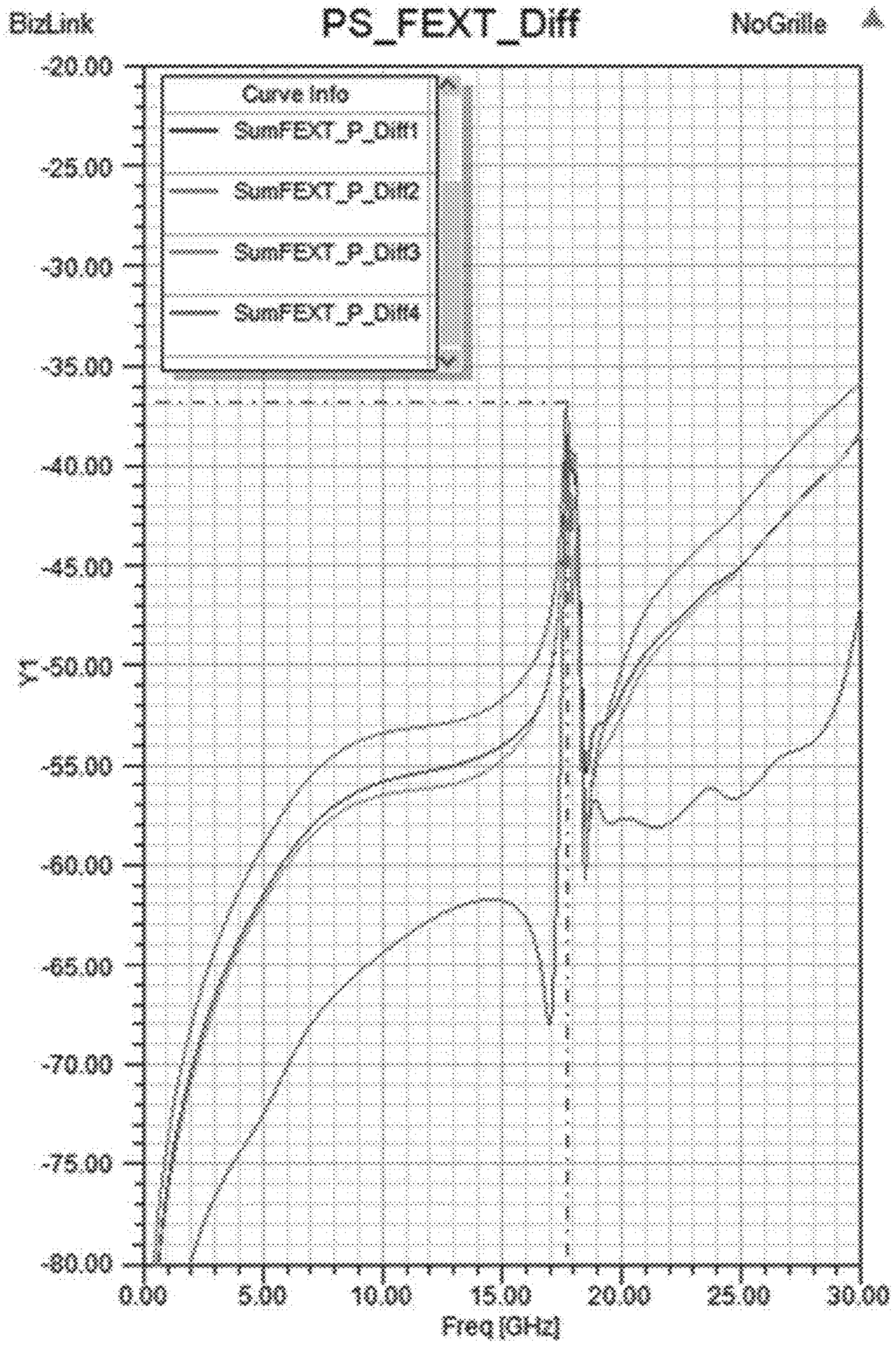
FIG. 4 is a simulation diagram of the crosstalk of the connector of the third embodiment.

Please see FIG. 4, which shows a simulation diagram of the crosstalk of the connector of the third embodiment. The arrangement of the terminals of this embodiment is the same as that of the first embodiment, and the difference between this embodiment and the first embodiment is that no protrusion 23 in this embodiment. As shown in FIG. 4, the peak of crosstalk is reduced from −27 dB of FIG. 1D to −37 dB. It can be seen that the design of adjusting terminal spacing can improve the influence of crosstalk to a certain extent.

Figure 3B:
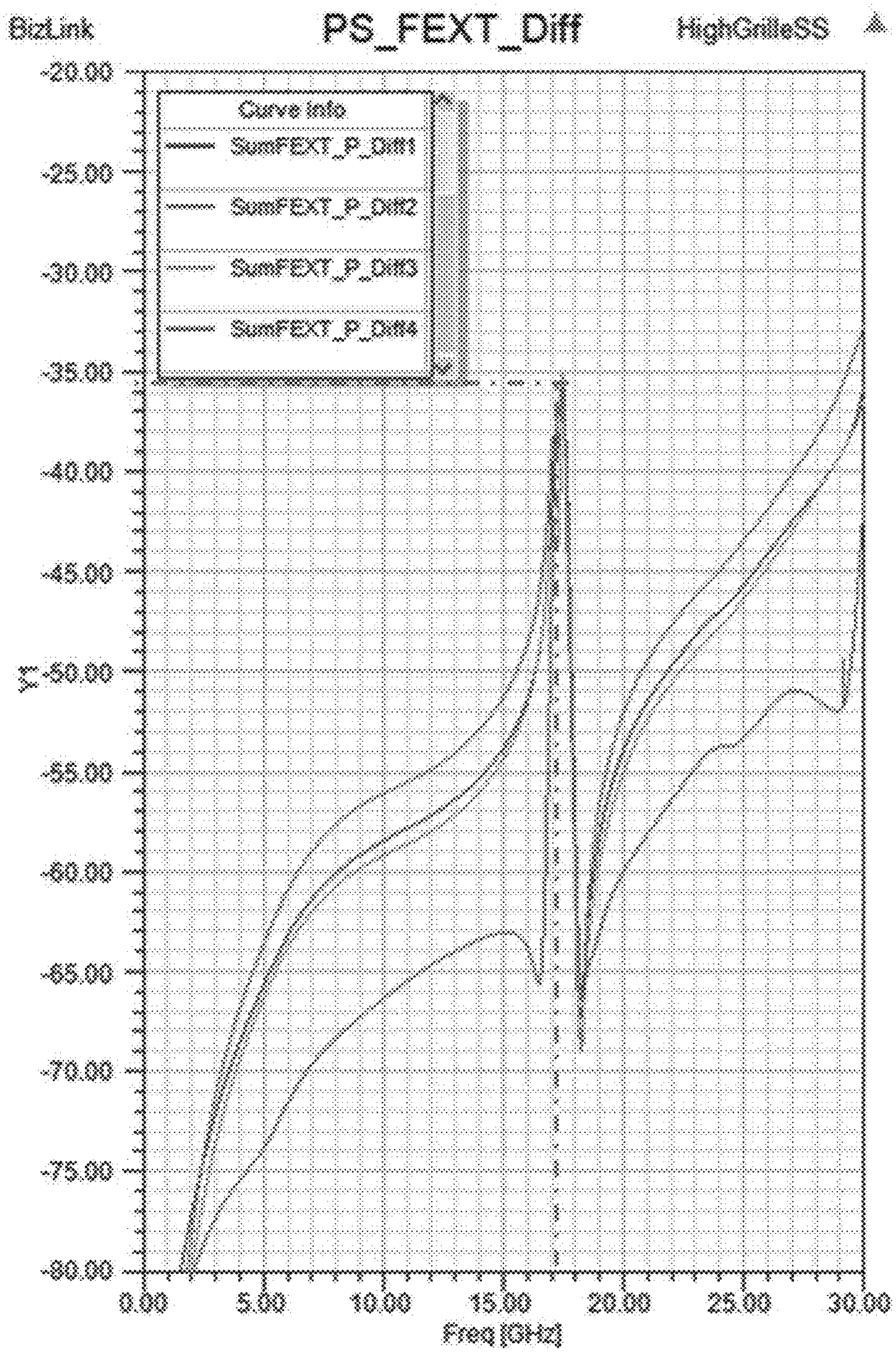
FIG. 3B is a simulation diagram of the crosstalk of the connector of the second embodiment.

It is to be noted that the design of the connector having no protrusion 23 at all and merely adjusting the terminal spacing (e.g., FIG. 4) has a better improved effect of crosstalk than the modified design of the connector having too tall protrusion 23 and adjusting the terminal spacing (e.g., FIG. 3B). That is, it can be seen that when at least a part of the protrusion 23 protrudes from the first signal terminal 12 by a height greater than half the thickness of the first signal terminal 12, an adverse effect will be produced, and the adverse effect increases with the increase of the height of the protrusion 23. Accordingly, when the connector transmits data, it is recommended to maintain the height of the protruding part of the protrusion 23 at 30% of the thickness of the first signal terminal 12 to ensure that it can improve the effect of crosstalk.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A signal connector, comprising:

a terminal module sequentially comprising a first ground terminal, a first signal terminal, a second signal terminal, and a second ground terminal that are arranged in parallel; and an insulating base comprising a plug opening, wherein the terminal module is fixed at a connection opening, the insulating base comprises an inner surface, a protrusion is formed on the inner surface between the first signal terminal and the second signal terminal, the protrusion is configured to form a block between the first signal terminal and the second signal terminal, and at least a part of the inner surface between the first signal terminal and the first ground terminal is flat and has no protrusion formed therebetween;

wherein each of the first ground terminal, the first signal terminal, the second signal terminal, and the second ground terminal comprises a fixing section, a movable section, and a contact section that are arranged in sequence, the fixing section is a part to fix with the insulating base, the contact section is a part to connect an external connector, and the movable section is a part to connect the fixing section and the contact section, wherein said inner surface comprises an inclined part, and a thickness of the inclined part is gradually increased along an extending direction of the fixing section, the movable section, and the contact section in a vertical direction, wherein the protrusion is at least formed between the movable section of the first signal terminal and the movable section of the second signal terminal;

when the signal connector transmits a signal, the entire protrusion is buried in and between the first signal terminal and the second signal terminal, and a height of the protrusion along a horizontal direction is substantially between 30% and 70% of a height of the movable section of the first signal terminal along the horizontal direction.

2. The signal connector of claim 1, wherein the first signal terminal and the second signal terminal are a differential pair, a minimum parallel distance between the movable section of the first signal terminal and the movable section of the second signal terminal is a first distance, a maximum parallel distance between the first signal terminal and the second signal terminal is a second distance, and the first distance is less than the second distance.

3. The signal connector of claim 2, wherein a value of the second distance divided by the first distance is greater than or equal to 1.1.

4. The signal connector of claim 2, wherein a minimum parallel distance between the first signal terminal and the second signal terminal at the fixing sections is a third distance, a minimum parallel distance between the first signal terminal and the first ground terminal is a fourth distance, and a value of the fourth distance divided by the third distance is greater than or equal to 1.1.

5. The signal connector of claim 1, wherein said inner surface sequentially comprises a flat part adjacent to the inclined part.

6. The signal connector of claim 5, wherein heights of parts of the protrusion at said inner surface are the same except at an end of the block.

7. A signal connector, comprising:

a terminal module sequentially comprising a first ground terminal, a first signal terminal, a second signal terminal, and a second ground terminal that are arranged in parallel; and an insulating base comprising a plug opening, wherein the terminal module is fixed at a connection opening, the insulating base comprises an inner surface, a protrusion is formed on the inner surface between the first signal terminal and the second signal terminal, the protrusion is configured to form a block between the first signal terminal and the second signal terminal;

wherein each of the first ground terminal, the first signal terminal, the second signal terminal, and the second ground terminal comprises a fixing section, a movable section, and a contact section that are arranged in sequence, the fixing section is a part to fix with the insulating base, the contact section is a part to connect an external connector, and the movable section is a part to connect the fixing section and the contact section, wherein at least a part of the protrusion is formed between the movable section of the first signal terminal and the movable section of the second signal terminal; said inner surface comprises an inclined part, and a thickness of the inclined part is gradually increased along a vertical direction;

when the signal connector transmits a signal, a height of the protrusion along a horizontal direction is substantially between 30% and 70% of a height of the movable section of the first signal terminal along the horizontal direction.

* * * * *